United States Patent [19]

Johnson

[11] 4,228,139

[45] Oct. 14, 1980

[54] FLUE GAS SCRUBBING PROCESS USING FLY ASH ALKALI

[75] Inventor: Carlton A. Johnson, Old Tappan, N.J.

[73] Assignee: Peabody Process System, Inc., Stamford, Conn.

[21] Appl. No.: 18,291

[22] Filed: Mar. 6, 1979

[51] Int. Cl.$^2$ ............................................. C01B 17/00
[52] U.S. Cl. ................................................... 423/242
[58] Field of Search .......... 423/242 A, 242 R, 244 A, 423/244 R

[56] References Cited

U.S. PATENT DOCUMENTS

| | | | |
|---|---|---|---|
| 4,002,724 | 1/1977 | McKie | 423/242 A |
| 4,080,428 | 3/1978 | Holter et al. | 423/242 A |

FOREIGN PATENT DOCUMENTS 3969969  8/1933  United Kingdom ................ 423/242 R

*Primary Examiner*—O. R. Vertiz
*Assistant Examiner*—Gregory A. Heller
*Attorney, Agent, or Firm*—St. Onge, Steward, Johnston, Reens & Noe

[57] ABSTRACT

There is disclosed a fly ash utilization system and process for the removal of sulfur dioxide from the flue gas of coal fired boilers. The principal features of the invention are the maintaining of high ionic concentration in a closed loop, water balanced system which is operated at a low pH, i.e. less than 4 and preferably less than 3. The ionic concentration of the scrubber slurry is maintained at at least 5,000 parts per million of alkali metal cations, preferably over 10,000 parts per million, at least a substantial portion of which has been leached from fly ash.

The ionic concentration of the scrubber slurry is maintained at a high level by either providing small diked areas in a waste pond for settling of undissolved solids wherein the returned supernatant has a high ionic concentration. A thickener and filter system may also be used to recover high ionic concentration supernatant for return to the scrubber. A principal advantage of the system is that there is a substantially reduced liquid-to-gas ratio required for scrubbing $SO_2$, with substantial savings in pumping and power requirements for the system.

9 Claims, 5 Drawing Figures

FLUE GAS SCRUBBING PROCESS USING FLY ASH ALKALI

FIELD OF THE INVENTION

This invention relates to the utilization of fly ash for the removal of sulfur dioxide from flue gases.

BACKGROUND OF THE INVENTION

Coal fired boilers for power plants and the like must comply with emission standards in the United States and in other countries throughout the world with regard to both particulate fly ash and with sulfur dioxide ($SO_2$) emissions. In one prior art approach the problems are treated individually with the fly ash being collected for disposal and the $SO_2$ being removed by the lime or limestone slurry in a scrubber or absorber. Such a system can be represented by the following flow chart.

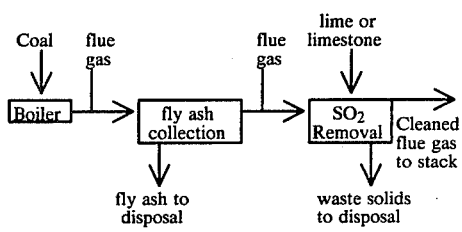

In the above system the fly ash is generally collected by use of either an electrostatic precipitator or a filter bag house.

It is also known to utilize the fly ash, however, as a source of alkali for removal of $SO_2$ from the flue gas, and in such case the system flow chart is as follows:

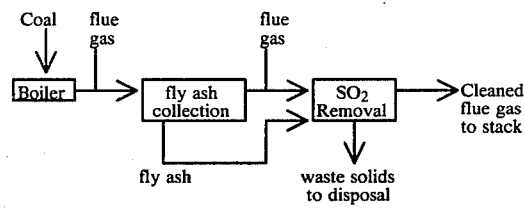

In the utilization of fly ash as a source of alkali, the fly ash is acid leached and in general the lower the pH of the leaching solution, the more alkali will be removed from the fly ash.

It is also known that to maximize the use of fly ash alkali the scrubber system should be operated at a pH of 4 or less.

The sulfur content as well as the ash and alkali content of coal varies from place to place over a considerable range. The use of fly ash as an alkali source depends upon the ratio of calcium and other cations to the amount of sulfur in the coal.

In a lime or limestone $SO_2$ flue gas scrubbing system the slurry is recirculated through an absorption tower for contact with the flue gas to be cleaned. The $SO_2$ is thus dissolved in the water phase of the scrubbing medium to produce sulfurous acid. In such a lime or limestone system calcium ions are produced by dissolution of calcium hydroxide or calcium carbonate which then reacts with the absorbed $SO_2$ to produce an insoluble solid precipitate. In the utilization of collected fly ash, however, the cations to react with the $SO_2$ can be provided all or in part by the acid leached fly ash rather than by the addition of lime or limestone to the scrubbing slurry.

The invention accordingly comprises the several steps and the relation of one or more of such steps with respect to each of the others thereof, which will be exemplified in the process hereinafter disclosed, and the scope of the invention will be indicated in the claims.

SUMMARY OF THE INVENTION

The invention comprises the utilization of fly ash for the removal of sulfur dioxide from flue gas by acid leaching the fly ash to provide a high ionic strength scrubber slurry and maintaining the high ionic concentration in a closed loop water balanced system and contacting the flue gas with the scrubber slurry at a pH of less than about 4, preferably less than a pH of 3. The ionic concentration of the scrubber slurry preferably is maintained at over about 5,000 parts per million of alkali metal cations and more preferable over 10,000 parts per million of alkali metal cations in the scrubber slurry. The closed loop water balanced system utilizes a small volume waste reservoir with a return of scrubber slurry supernatant from the waste reservoir so that the ionic concentration of the supernatant is not permitted to be diluted prior to removal of the supernatant. The preferred method of maintaining the ionic concentration of the scrubber slurry is to provide small diked areas in a waste pond where scrubber slurry and undissolved solids are initially received and after some settling of solids the supernatant is returned to the scrubber from the relatively small volume diked area of the pond. As the first small diked area in the waste pond is filled with solids, successive diked areas are created to maintain the ionic concentration of the scrubber slurry supernatant as the scrubber slurry and undissolved solids are again directed to each successive small receiving reservoir for the scrubber waste. A thickener and filter system may also be used to recover high ionic concentration slurry supernatant in the system. The system is water balanced, e.g. only enough make up water is added to the system to replace that lost by evaporation or entrainment in removed solids. The maintaining of a high ionic concentration in the scrubber slurry substantially reduces the liquid to gas ratios involved with substantial savings in pumping and power requirements for operating the system. In another aspect of the invention a wet venturi scrubber is preferred for collecting the fly ash. The use of the wet venturi scrubber eliminates problems associated with fly ash handling and integrates the fly ash removal into the $SO_2$ scrubber loop.

DETAILED DESCRIPTION OF PREFERRED EMBODIMENTS

Figure 1:
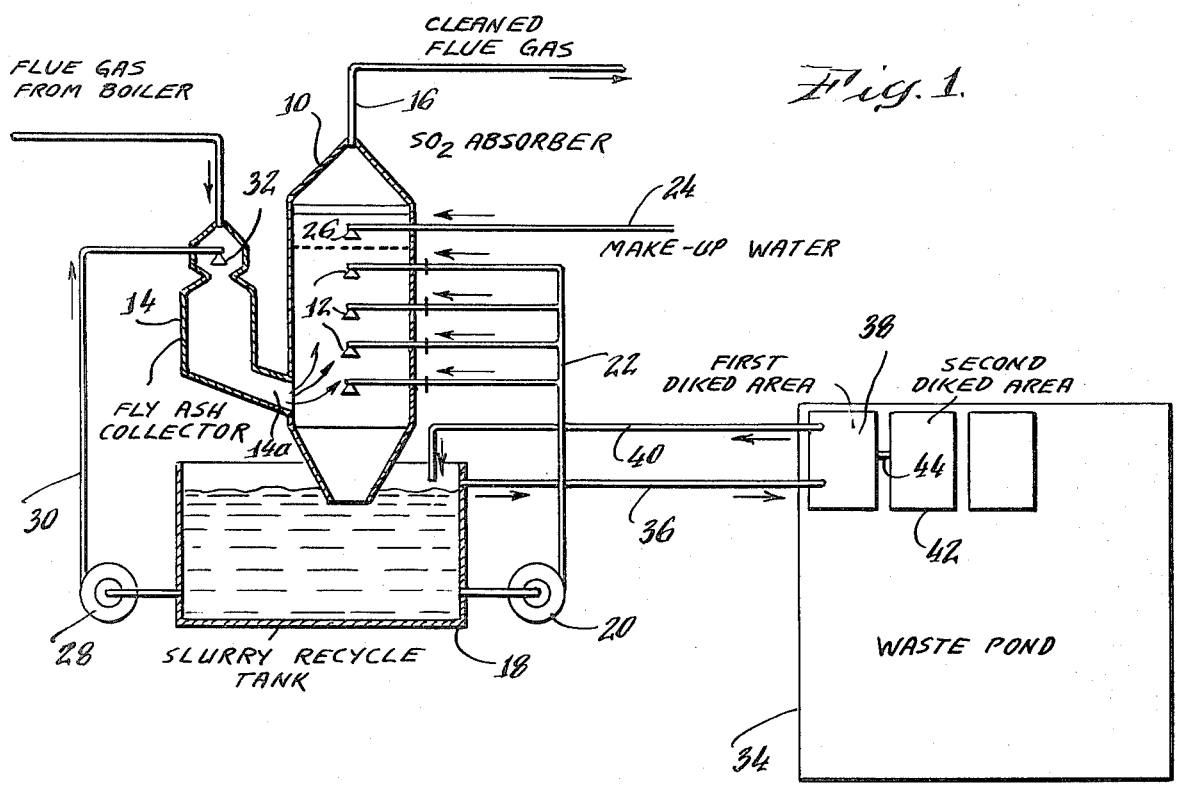
FIG. 1 is a flow sheet and schematic drawing of the process of the invention showing a multiple diked area waste pond for return of supernatant to the scrubber loop.
Figure 1A:
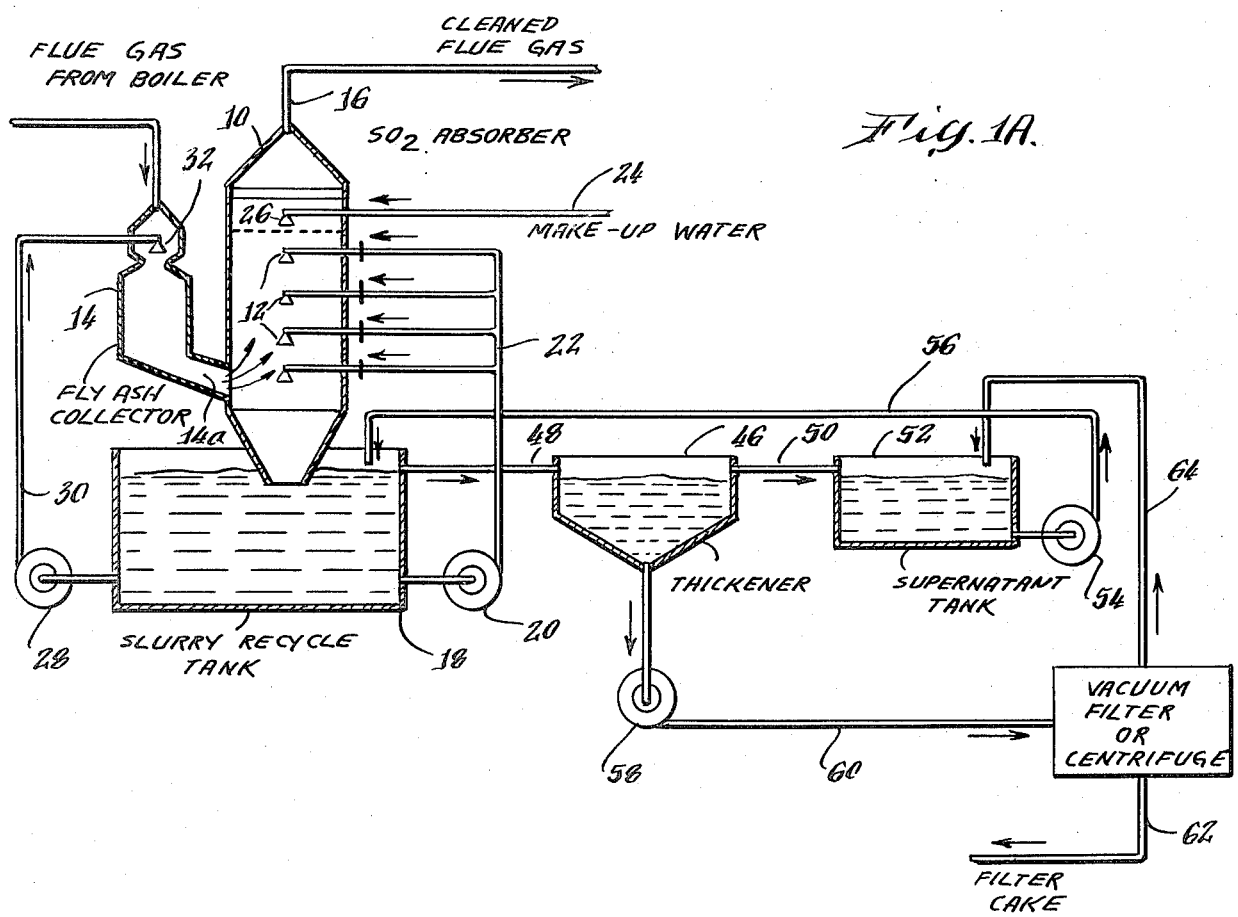
FIG. 1A is an alternate embodiment of the invention showing the use of a thickener and filter system for return of supernatant to the scrubber loop.

Referring to FIGS. 1 and 1A, the scrubber system in accordance with the present invention is schematically shown and there is provided an $SO_2$ absorber 10 having a number of sprays 12 for contacting scrubber slurry with flue gas which is first passed through a fly ash collector 14 which is preferably a wet venturi. The fly ash is then acid leached in the scrubber system to provide alkali cations to the scrubber slurry. The flue gas exits from the fly ash collector via duct 14a to flow upwardly through the absorber 10 and out conduit 16 as cleaned flue gas.

The $SO_2$ from the flue gas is absorbed in the sprayed scrubber slurry and is collected in the slurry recycle tank 18. Pump 20 pumps the scrubber slurry through conduit 22 back to the spray heads 12 with any makeup water required being introduced by a conduit 24 and spray head 26.

Pump 28 and conduit 30 provide scrubber slurry to spray head 32 in the wet venturi for the collection of fly ash. The advantage of using a wet venturi is that there is no further handling of fly ash required in the system since the collected fly ash is flushed into the slurry recycled tank.

It is also understood that one or more trays or other contacting devices may be used instead of spray nozzles 12 in the absorber 10.

Referring to FIG. 1, scrubber slurry and undissolved solids including fly ash particulate and alkali metal sulfates and sulfites are conveyed to a waste pond 34 via conduit 36. In accordance with the invention, however, instead of merely dumping the slurry and undissolved solids into the waste pond and permitting the slurry supernatant to become dilute, the slurry is fed into a first diked area 38 which constitutes only a small portion of the pond to permit settling of the undissolved solids while the supernatant from area 38 is returned to the slurry recycle tank via conduit 40.

By diking off a relatively small area of the waste pond, a high ionic concentration of alkali cations is returned to the slurry recycle tank in the supernatant from the small segregated area of the waste pond. As the first diked area 38 fills up with undissolved solids, a second diked area 42 of the pond is then used to receive the scrubber slurry with undissolved solids and the supernatant return conduit 40 is positioned to remove supernatant from are 42. The second diked area may be put into use before the first diked area is completely full of undissolved solids by use of an overflow pipe or channel 44 between the two area. In such case the inlet conduit 36 would still empty into the first diked area while the supernatant return conduit 40 would be positioned in the second diked area.

By the use of such a system, the ionic strength of the returned supernatant is maintained at the highest ionic strength possible, i.e. in excess of 5,000 ppm and preferably in excess of 10,000 ppm. The maintenance of the high ionic concentration in the supernatant substantially reduces the liquid to gas ratio and consequently reduces the amount of pumping horsepower required to circulate the scrubber slurry.

Referring now to FIG. 1A, in an alternate embodiment of the invention, it will be seen that a thickener 46 may be used to receive slurry and undissolved solids through conduit 48 with supernatant being drawn off by conduit 50 to supernatant tank 52 for return to the scrubber loop via pump 54 and conduit 56. Pump 58 and conduit 60 pass the concentrated solid slurry from the thickener to a vacuum filter or centerfuge where filter cake is removed as at 62 with the supernatant being returned to the supernatant tank via conduit 64. Thus the return of the supernatant in the system shown in FIG. 1A will also have high ionic concentration as in the system shown in FIG. 1.

Fly ash is a complex material and varies in its chemical components depending upon the source of the coal which is burned. Typical fly ash analyses are as follows:

TABLE 1

Fly Ash Analyses

| Component | Geographic Source | | |
|---|---|---|---|
| | Montana | Alaska | Spain |
| $SiO_2$ | 46.62 | 45.87 | 49.79 |
| $Al_2O_3$ | 16.09 | 22.88 | 18.53 |
| $Fe_2O_3$ | 20.13 | 6.50 | 8.17 |
| $CaO$ | 8.70 | 14.05 | 10.52 |
| $MgO$ | 3.40 | 4.80 | 2.43 |
| $Na_2O$ | 0.42 | 0.82 | 0.51 |
| $K_2O$ | 0.72 | 1.10 | 1.00 |
| $TiO_2$ | 0.61 | 0.92 | 0.83 |
| $P_2O_5$ | 0.08 | 1.33 | 1.01 |
| $SO_3$ | 1.37 | 0.22 | 1.56 |

Figure 2:
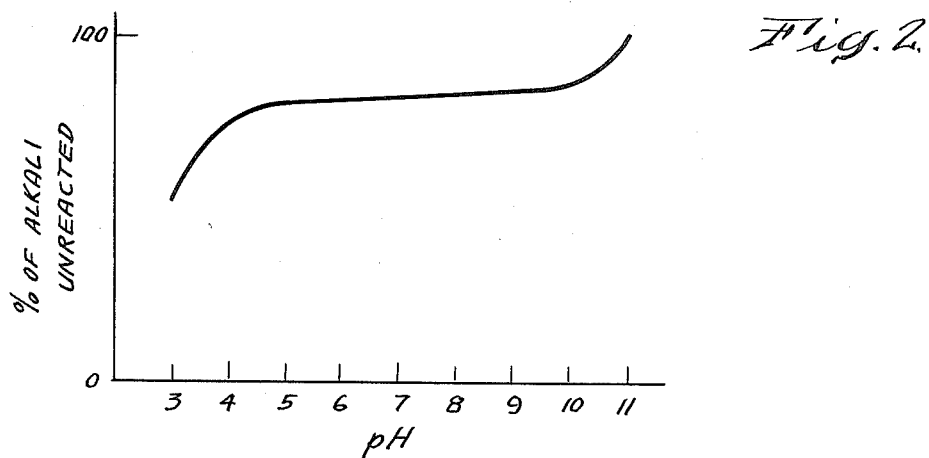
FIG. 2 is a typical graph showing the percent of unreacted alkali as a function of pH in typical acid leaching of alkali from fly ash.

As seen in Table 1 above, fly ash, although differing somewhat in its chemical makeup, generally has sufficient alkali cations for an $SO_2$ scrubbing system. The fly ash can be preliminarily tested to determine if it has sufficient alkali cations for use in such scrubbing system by extraction of fly ash samples and titration to determine the theoretical alkali available in the fly ash used. The procedure is generally to slurry a fly ash sample in water and titrate with sulfurous acid. The pH resulting from the addition of specific quantities of the acid is then measured. The amount of acid used for a given pH is directly related to the amount of alkali extracted from the fly ash sample. The percentage of the theoretical alkali of fly ash unextracted as a function of pH can then be plotted. The typical shape of the curve obtained from such laboratory test data is shown in FIG. 2.

Various fly ash samples have been tested and most show similar characteristics. At high pH, e.g. 9 or higher, few alkali cations are extracted. But as the pH drops more alkali cations are extracted until a plateau is reached in which the amount of alkali is almost constant. As the pH continues to drop there is a very sharp increase in the availability of alkali cations in the fly ash. This generally occurs at pH values of approximately 4 or less. Thus to obtain the greatest benefit of alkali cations extracted from the fly ash, the scrubbing recycle slurry should be operated at a pH of 4 or less, preferably 3 or less. The combination of low pH and high ionic concentration of alkali metal cations provides substantial savings in the scrubbing of flue gas from coal fired plants with fly ash extraction.

In practicing the present invention in a pilot plant system at a pH of around 2.5 with ionic concentration of the alkali cations being from about 10,000 to 45,000 ppm, $SO_2$ emission standards were achieved using only the alkali from fly ash with no supplemental alkali being required, thus eliminating significant operating costs.

Figure 3:
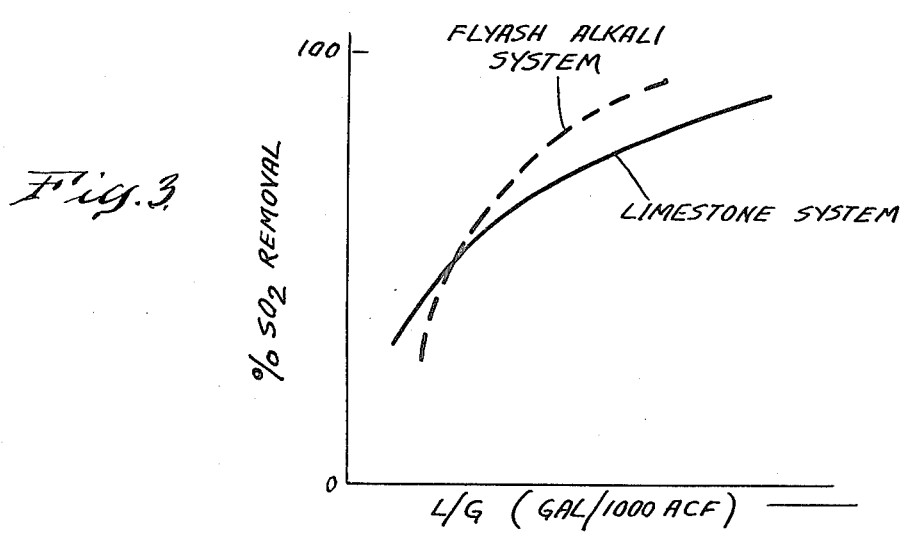
FIG. 3 is a typical graph showing performance curves illustrating the efficiency of $SO_2$ removal as a function of liquid to gas ratio (L/G) for a typical limestone wet scrubbing system and a wet scrubbing fly ash alkali system in accordance with the invention, each at an optimal constant pH.

In a conventional lime or limestone scrubber system the liquid to gas (L/G) ratio reflects the gallons of scrubber slurry required per 100,000 cfm of flue gas and is a direct measure of the pumping horsepower required for the system. It is known that the L/G ratio increases significantly as the pH of the slurry decreases and it would appear that under pH conditions required for optimal alkali extraction from the fly ash, i.e. a pH of 4 or less, that there would be a penalty in the required pumping horsepower for efficient $SO_2$ removal. It has been found however that when the ionic concentration of the alkali cation in the scrubber liquid is maintained at a high level, that the same $SO_2$ removal efficiency can be obtained at its significantly lower liquid to gas ratio, with consequent power savings in required pumping horsepower. A typical performance curve showing $SO_2$ removal efficiency as a function of liquid to gas ratio for both a limestone system and a fly ash alkali system are shown in FIG. 3. As seen in FIG. 3, the fly ash alkali system has a steeper curve at about the 50 percent $SO_2$ removal point, indicating that it is more efficient as to pumping horsepower than a limestone system for removal of $SO_2$ from flue gas.

At low $SO_2$ removal efficiencies, (e.g. 20-30 percent) there is not much difference in L/G requirements between the systems, with the limestone system requiring somewhat less than that required for fly ash alkali systems. Most $SO_2$ removal systems have high efficiency requirements, however, and the reduced L/G ratios for the fly ash system can result in savings of 20 percent or more of the pumping horsepower required for $SO_2$ removal.

In the fly ash there are a number of cations besides calcium which are extracted in varying degrees. Accordingly, the chemistry of the systems becomes analogous to an internal dual alkali system. A typical analysis of the liquid phase of the recycle slurry is shown below in Table II.

TABLE 2

| ION | CONCENTRATION ppm |
|---|---|
| $Ca^{++}$ | 325 |
| $Mg^{++}$ | 2136 |
| $Na^+$ | 33.1 |
| $K^+$ | 23.9 |
| $Fe^{++}$ | 78.5 |
| $Al^{+++}$ | 1400 |
| $SO_4^=$ | 16839 |
| $Cl^-$ | 17 |
| $SO_3^=$ | 2.5 |

Figure 4:
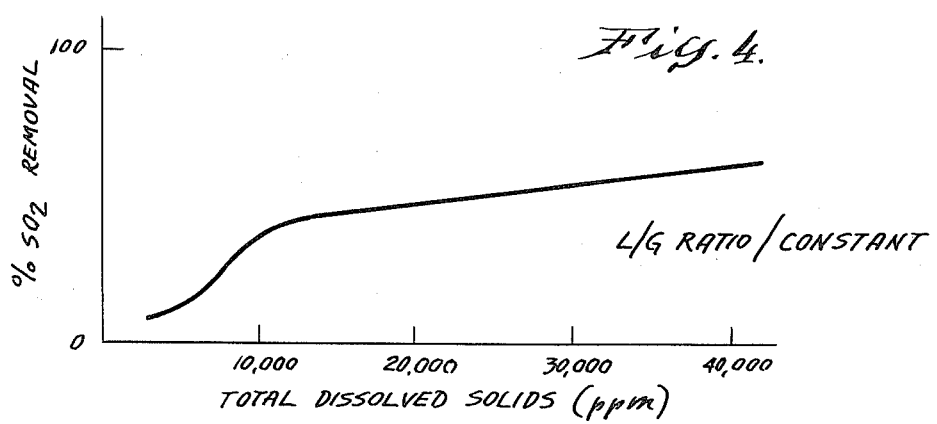
FIG. 4 is a graph showing the typical increase in $SO_2$ removal as the total dissolved solids in the scrubber slurry increases.

Operating data from the pilot plant have verified the importance of maintaining high ionic strength in the scrubbing system to achieve higher $SO_2$ removal efficiency. In these tests the scrubber was operated under varying ionic concentrations as expressed by total dissolved solids with all other factors remaining unchanged. The results are shown in the graph of FIG. 4 wherein the L/G ratio was held constant. As shown in FIG. 4, the percent of $SO_2$ removal continues to rise even after 10,000 or 20,000 ppm total dissolved solids are present in the scrubber slurry. It has been found that there should be at least 5,000 ppm of total dissolved solids and preferably over 10,000 ppm up to the economically practical or solubility limit of the slurry.

In accordance with the invention the system should be operated at the highest ionic strength possible for greatest scrubbing efficiency at the lowest L/G ratio. This is achieved by operating the system under a totally closed loop water balance with only enough makeup water added to the system sufficient to meet the evaporative load and the entrained water in the waste solids. This minimizes the amount of waste water effluent from the system and results in further economies in the small amount of waste water needing treatment.

In conventional lime or limestone scrubbing systems the waste solids are mainly calcium sulfite with some calcium sulfate. The ratio of the components vary with the operating conditions of the system, but in general the greater parts of the waste solids is calcium sulfite which is thixotropic and difficult to dewater in a waste solid disposal system. Under the fly ash utilization system substantially all of the waste solids are naturally oxidized to calcium sulfate which is very unsoluble and relatively easy to dewater. The use of a fly ash alkali scrubbing system shows significantly greater bulk settling rates and the undissolved solids can be concentrated in a thickener to well over 50 percent solids with thickener underflow producing a filter cake or about 85 percent solids, which is easily handled and has a dry sand-like granular appearance.

In conventional limestone $SO_2$ removal systems there are also scaling problems created by the precipitation of super-saturated calcium sulfate which deposits on the absorber surfaces. Control of the super saturation ratio limit (actual solubility to the theoretically solubility of calcium sulfate) is necessary to prevent scaling. Fly ash alkali utilization system can be operated with super saturation ratios of 1.0 and accordingly, there is little or no calcium sulfate scaling.

The system of the present invention thus provides substantial economic benefits by: (1) the reducing or eliminating the cost of alkali, (2) substantial reduction in power consumption (pumping horsepower), (3) reduction in initial capital investment, (4) reduction in waste solids handling and disposal costs, (5) improved system reliability with minimal risk of scaling.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

I claim:

1. The process of utilizing fly ash for the removal of sulfur dioxide from flue gas comprising the steps of
   A. acid leaching fly ash to provide a high ionic strength scrubber slurry;
   B. contacting the flue gas with said scrubber slurry at a pH of less than about 4; and
   C. maintaining the ionic concentration of the scrubber slurry at a concentration at over about 5,000 ppm by recycling the scrubber slurry supernatant in a closed loop, water balanced system comprising a waste reservoir with an inlet conduit for scrubber slurry and solids and a return conduit for scrubber slurry supernatant, said waste reservoir having a relatively small volume to retain high ionic concentration of the scrubber slurry supernatant which is returned to recontact the flue gas.

2. The process defined in claim 1 wherein said water reservoir is a waste pond having a relatively small inlet area at least partially segregated from the remainder of the pond by a dike and said return conduit is located in the diked inlet area.

3. The process defined in claims 1, or 2 wherein the ionic concentration of the scrubber slurry is maintained at over about 10,000 ppm.

4. The process for the utilization of fly ash for the removal of sulfur dioxide from flue gas comprising the steps of
   A. collecting fly ash from the flue gas;
   B. acid leaching the collected fly ash to provide a high ionic strength scrubber slurry;
   C. contacting the flue gas in a scrubber with said scrubber slurry at a pH of about 4 or less; and
   D. maintaining the ionic concentration of said scrubber slurry at over about 5,000 ppm in a closed loop, water balanced system wherein the waste reservoir initially receiving scrubber slurry and undissolved solids has a relatively small volume to maintain high ionic concentration in the scrubber slurry supernatant returned to contact the flue gas.

5. The process defined in claim 4 wherein the fly ash collection is by means of a wet venturi scrubber.

6. The process of the utilization of fly ash for the removal of sulfur dioxide from flue gas comprising the steps of
   A. collecting fly ash from the flue gas;
   B. acid leaching the collected fly ash to provide a high ionic strength scrubber slurry;
   C. contacting the flue gas in a scrubber with said scrubber slurry while maintaining the pH of said scrubber slurry at about 4 or less; and
   D. maintaining the ionic concentration of said scrubber slurry at over about 5,000 ppm in a closed loop, water balanced system by providing a relatively small diked area in a waste pond for initially receiving scrubber slurry and undissolved solids and returning the scrubber liquid supernatant to the scrubber from the diked area.

7. The process defined in claim 4 or 6 wherein the ionic concentration of the scrubber slurry is at least about 10,000 ppm.

8. In the removal of sulfur dioxide from flue gas wherein the flue gas is contacted with a scrubber slurry having at least several different alkali metal cations extracted from fly ash by acid leaching of the fly ash in the scrubber slurry and contacting the flue gas with a scrubber slurry having a pH of about 4 or less, the improvement comprising the maintenance of an ionic concentration of at least about 10,000 ppm or greater by returning scrubber slurry supernatant from a waste reservoir having a relatively small volume whereby the high ionic concentration of the supernatant liquid is maintained while solids are removed from the system.

9. The process defined in claim 6 or 8 wherein successive small diked areas are provided in the waste pond to receive scrubber slurry and undissolved solids as each prior diked area is substantially filled with waste solids and the scrubber liquid supernatant is returned from the receiving diked area of the waste pond.

* * * * *